United States Patent [19]

Hatchadoorian et al.

[11] Patent Number: 4,526,831
[45] Date of Patent: Jul. 2, 1985

[54] PROCESS FOR THERMOFORMING REINFORCED POLYMER SHEETS

[76] Inventors: Edward Hatchadoorian, 10 Northcliffe Dr., Wilmington, Del. 19809; George J. Ostapchenko, 202 Saddler Ave., Wilmington, Del. 19803; James L. Patton, Box 3733, Wilmington, Del. 19807; Harlan S. Young, 5455 Pinehurst Dr., Wilmington, Del. 19808

[21] Appl. No.: 577,767

[22] Filed: Feb. 7, 1984

Related U.S. Application Data

[60] Division of Ser. No. 390,683, Jun. 21, 1982, Pat. No. 4,457,797, which is a continuation-in-part of Ser. No. 355,711, Mar. 8, 1982, abandoned.

[51] Int. Cl.$^3$ ............................................. B32B 27/34
[52] U.S. Cl. ................................. 428/287; 428/284; 428/297; 428/303; 428/430
[58] Field of Search ............... 428/283, 285, 290, 292, 428/297, 303, 325, 430, 287, 284

[56] References Cited

U.S. PATENT DOCUMENTS

| | | | |
|---|---|---|---|
| 3,496,143 | 2/1970 | Siggel et al. | 260/75 |
| 3,935,358 | 1/1976 | Wyeth et al. | 428/166 |
| 4,127,631 | 11/1978 | Dempsey et al. | 528/171 |
| 4,414,266 | 11/1983 | Archer et al. | 428/430 |

OTHER PUBLICATIONS

Thermoforming Crystallizing PET, J. L. Throne, Boston, SPE-Antec Meeting, 5/5/81, pp. 598–600.

Primary Examiner—James J. Bell

[57] ABSTRACT

Reinforced poly(ethylene terephthalate) sheets are thermoformed to articles having one or more surfaces in contact with the mold of such a degree of smoothness that they virtually completely replicate the mold face. When the mold face is completely smooth, the concave imperfections caused by air entrapment in the plastic material account for less than 6% of the surface area. Composite articles consisting of a face member and a backing member are made by thermoforming in a single mold a face member having one or more surfaces in contact with the mold face of such a degree of smoothness that it completely replicates the mold face, and its proportion of concave imperfections is less than about 6% of the surface area. The backing member is bonded in the mold with an adhesive to the face member, and the composite structure is allowed to remain in the mold for a sufficient time to permit subsequent removal without distortion. The initial polymer sheets are less than about 5% crystalline, but the thermoformed article is left in the mold until it crystallizes to the desired degree.

38 Claims, 14 Drawing Figures

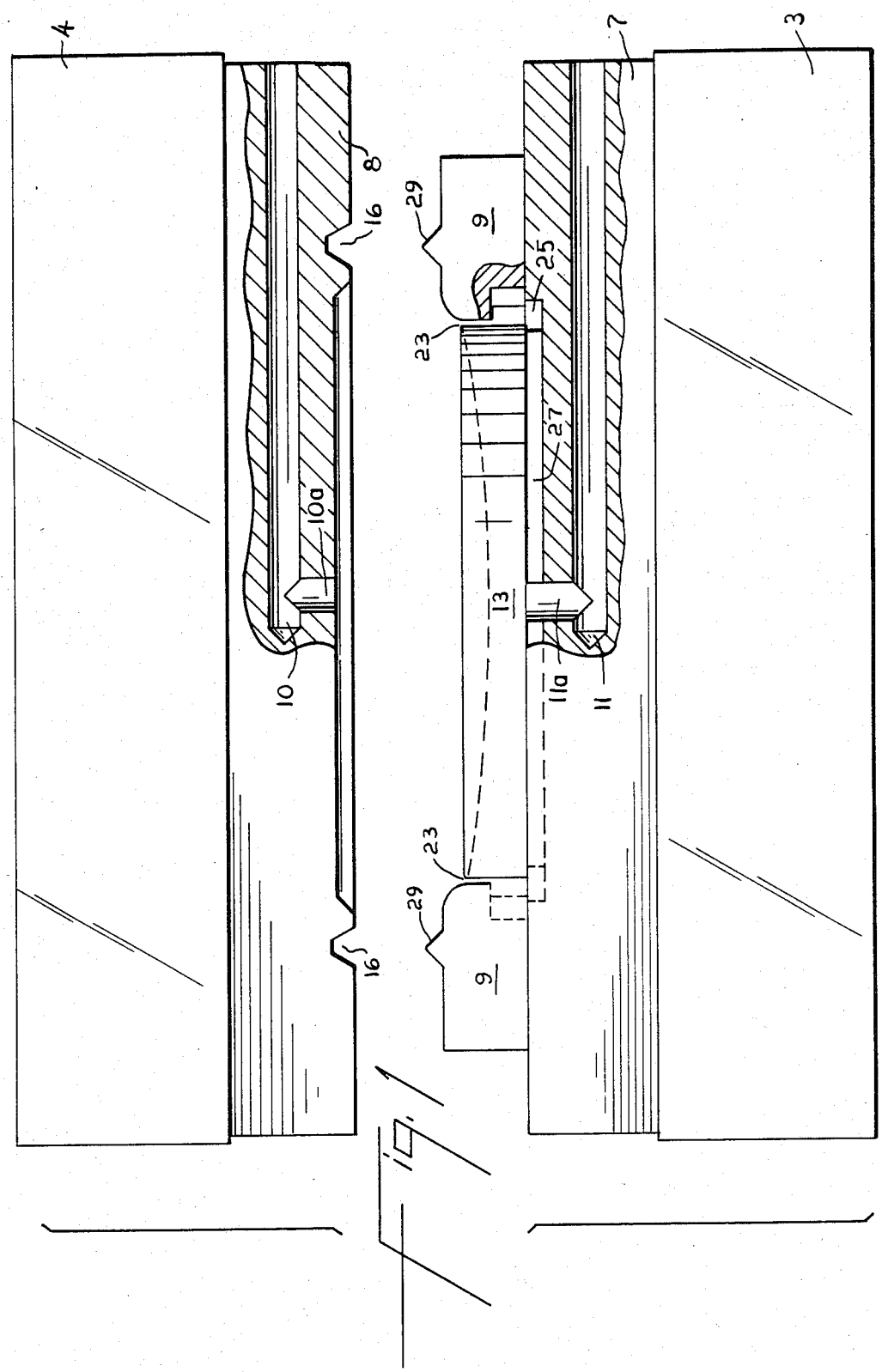

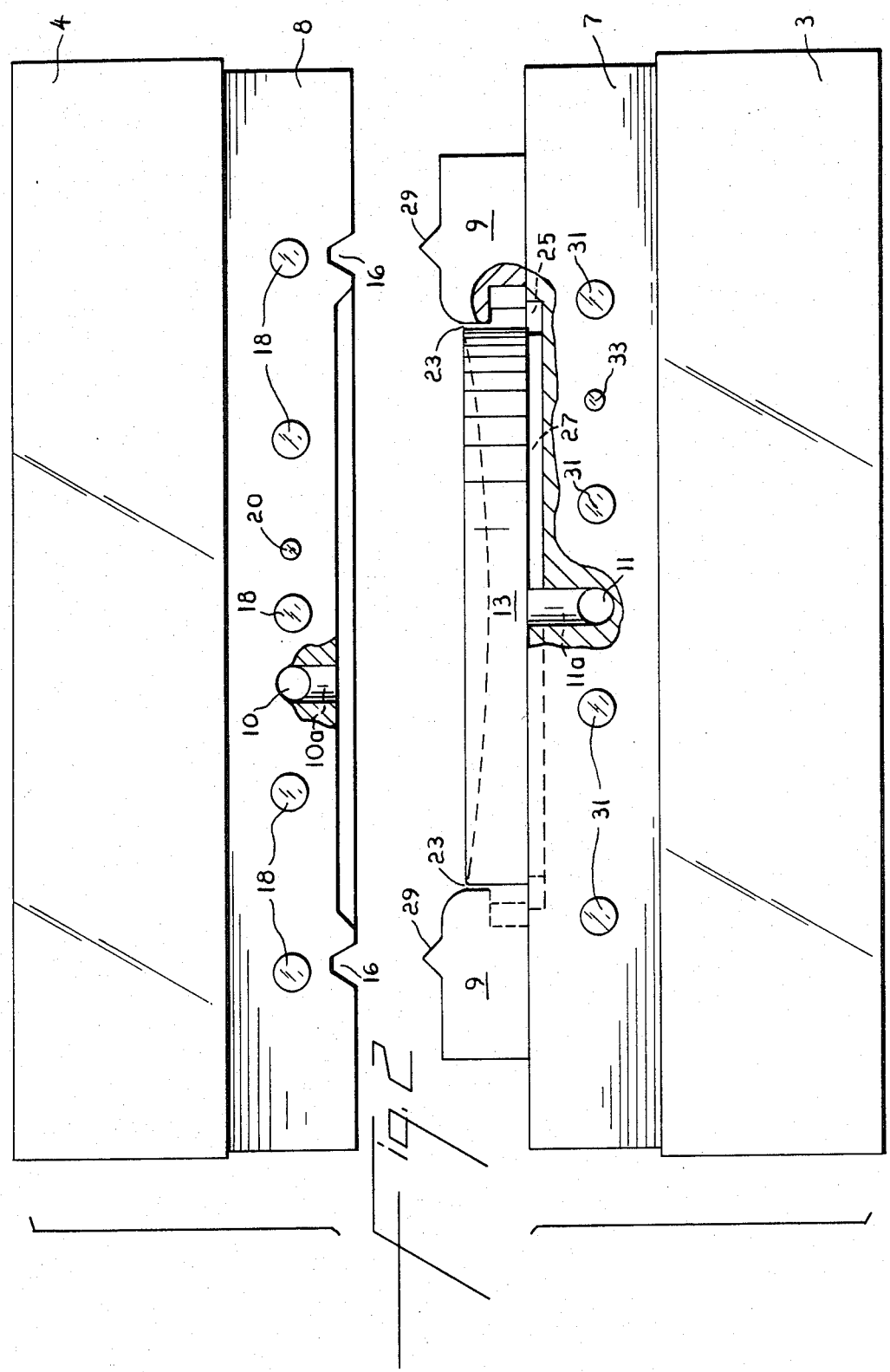

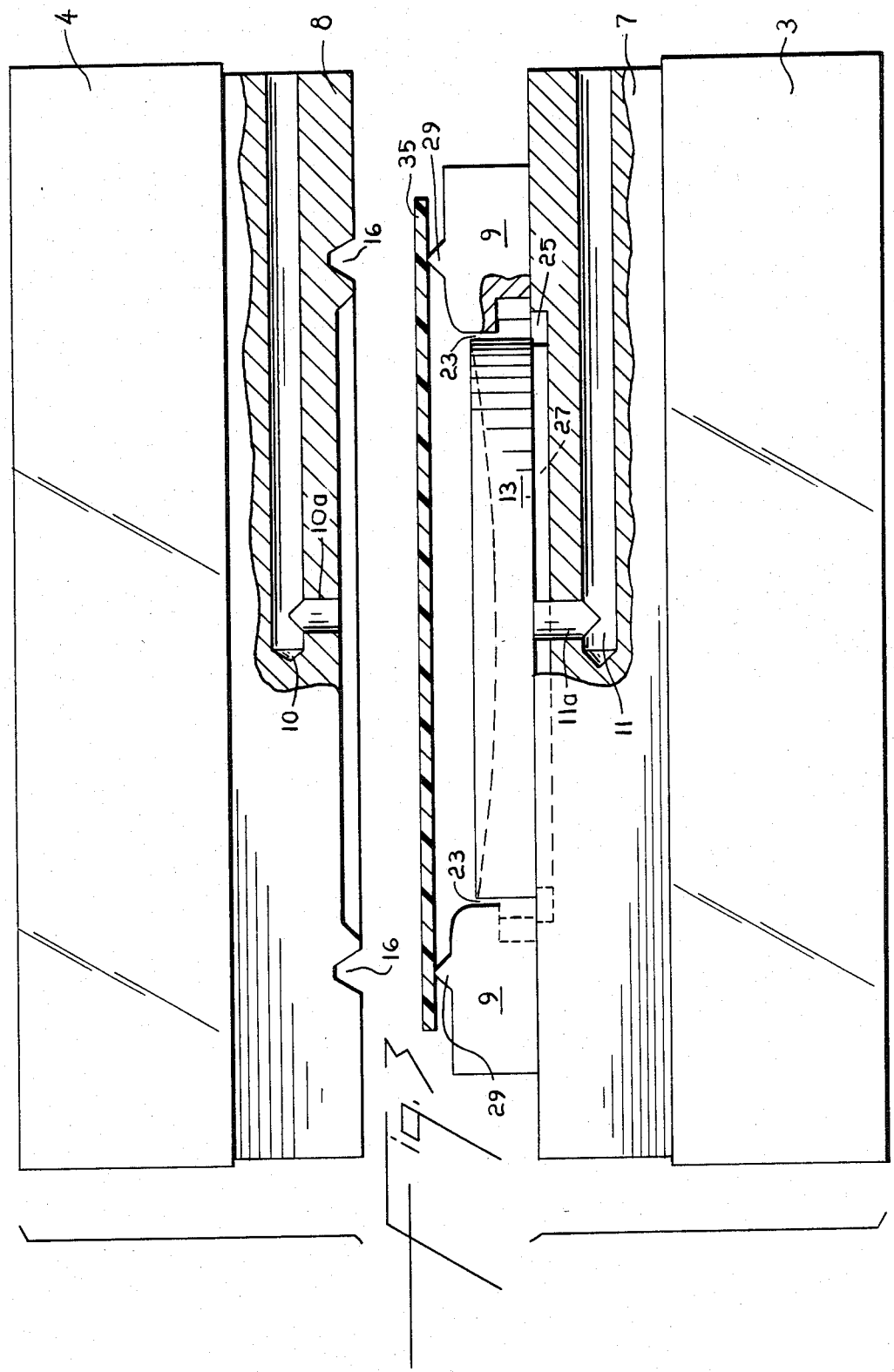

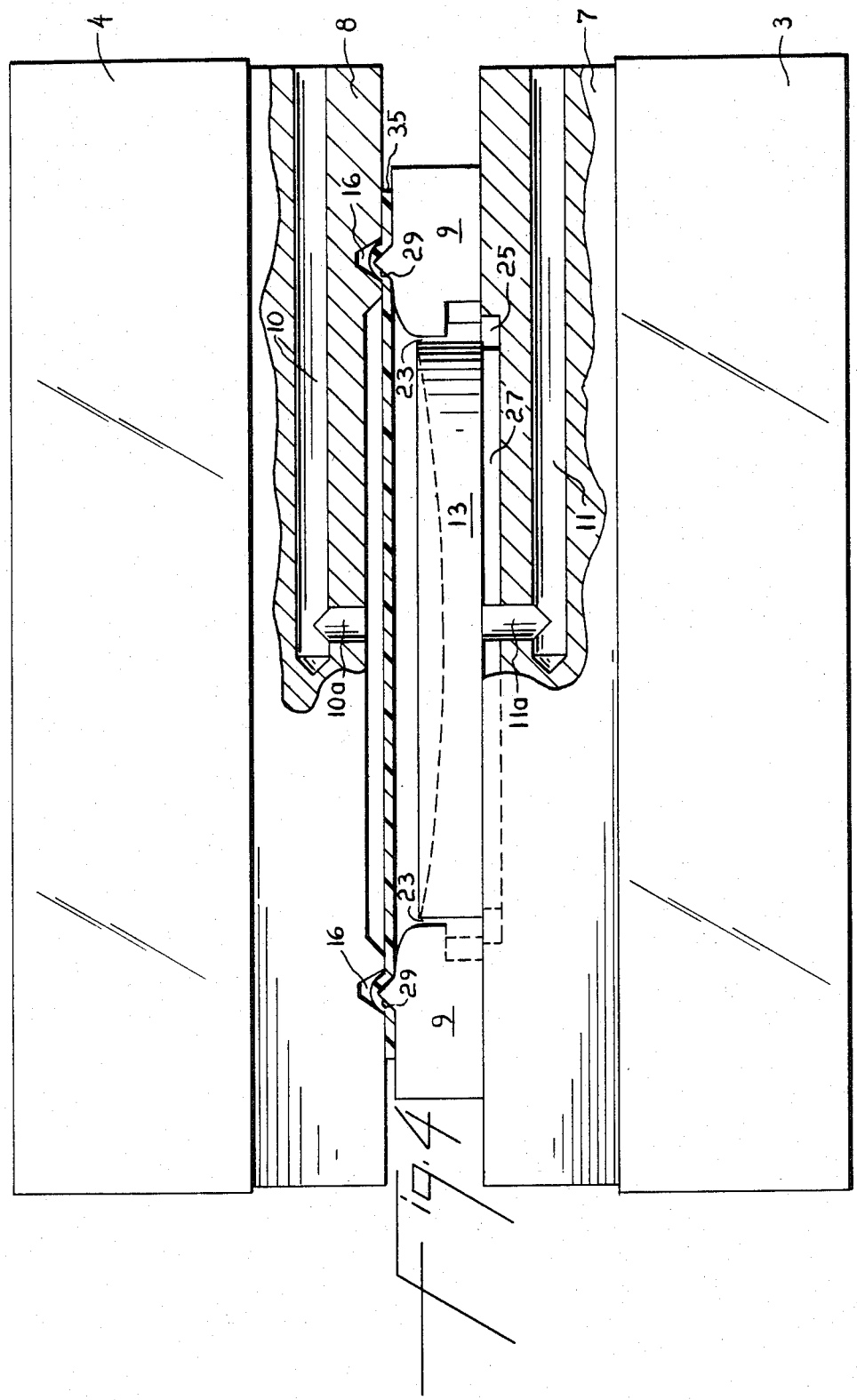

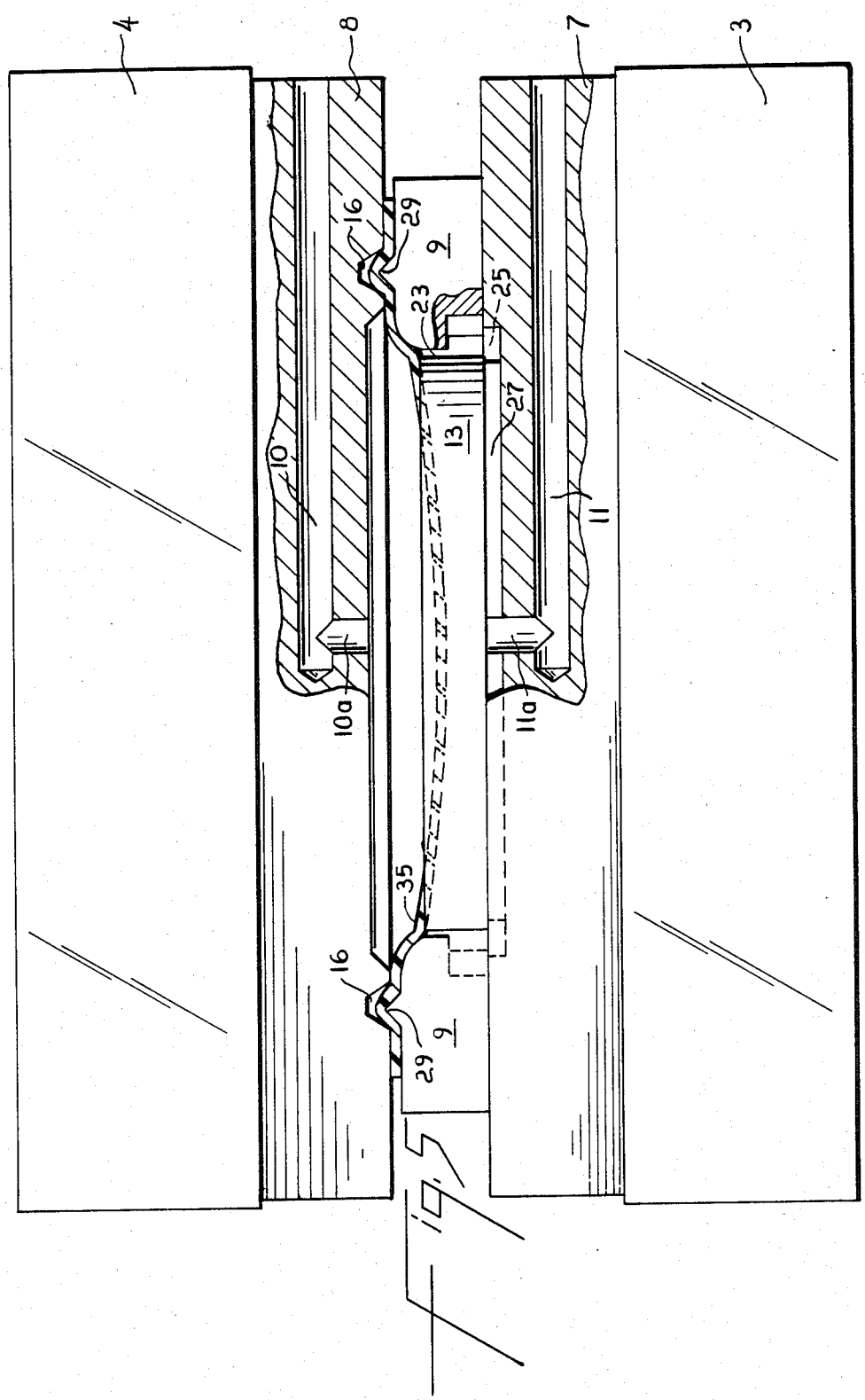

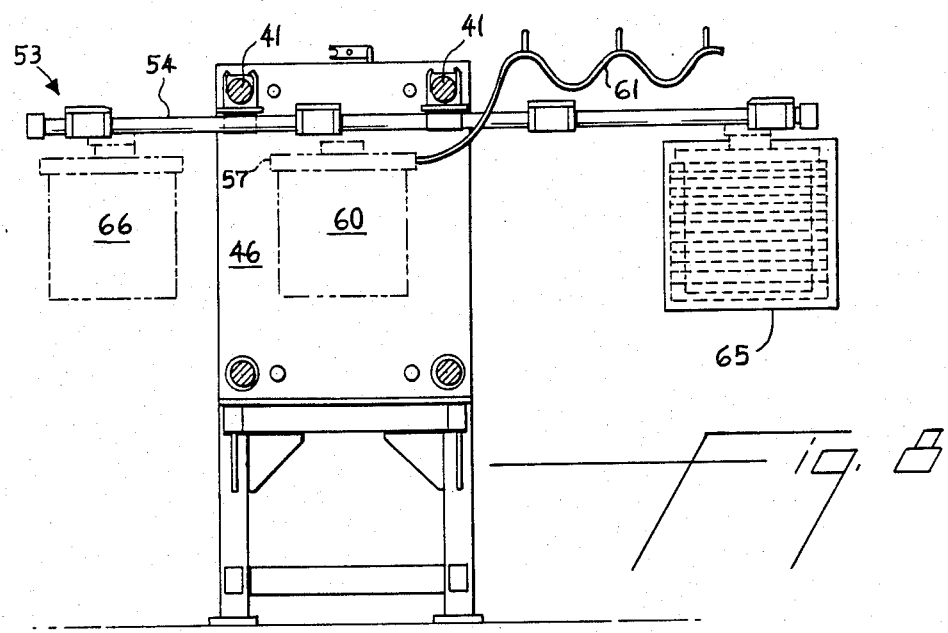
Fig. 8
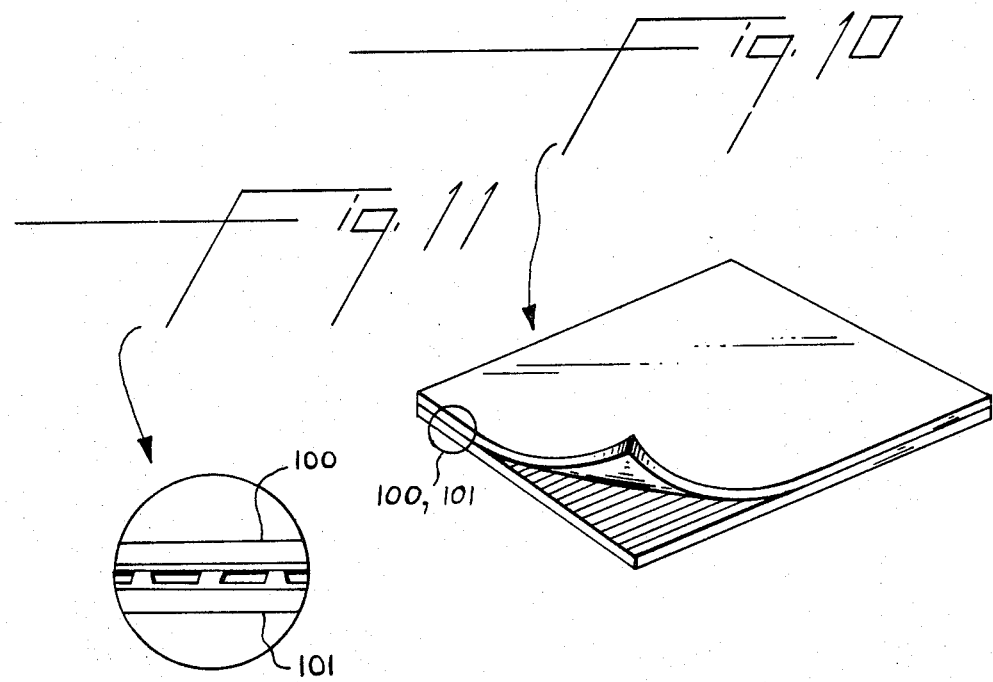
Fig. 10
Fig. 11

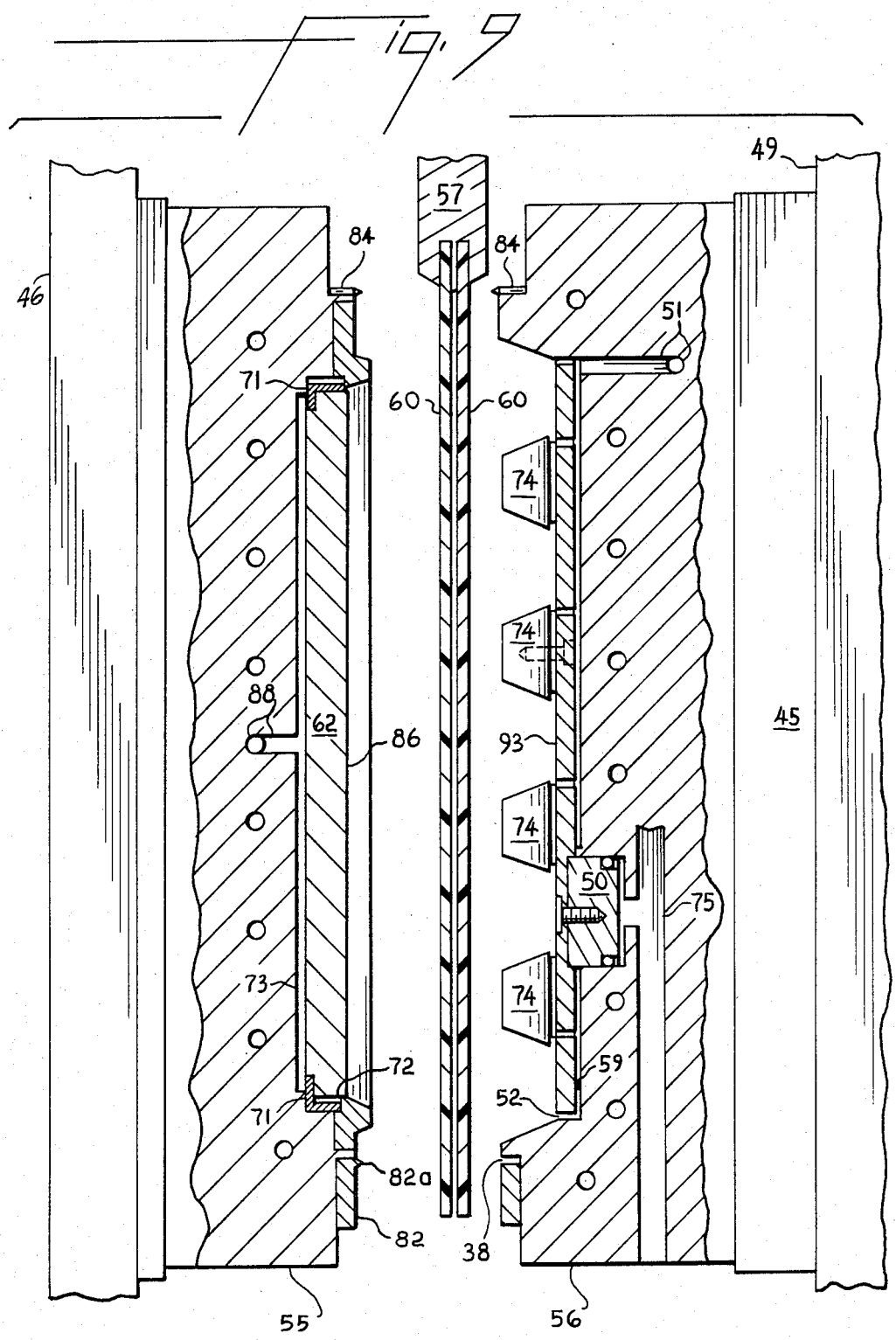

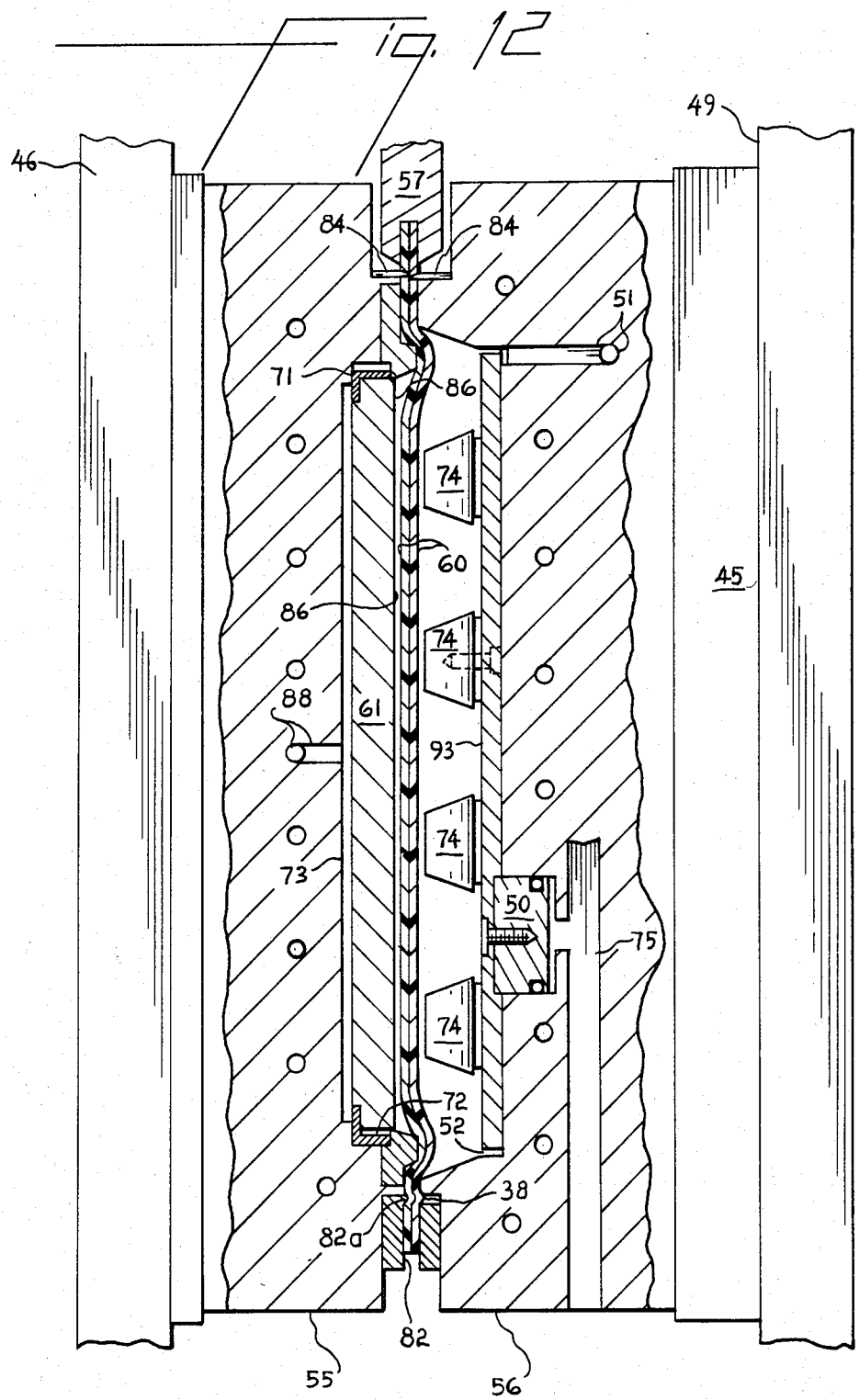

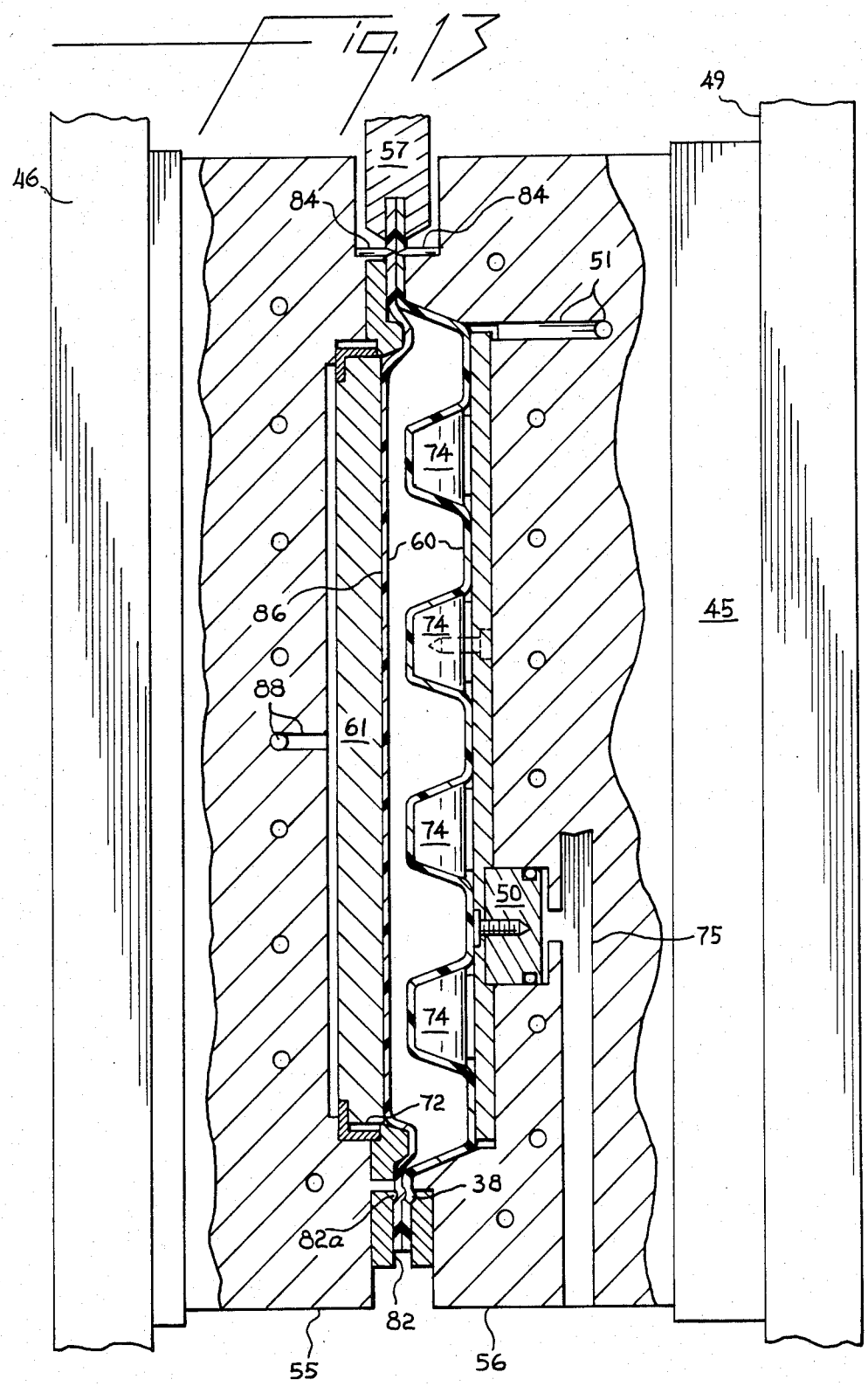

4,526,831

PROCESS FOR THERMOFORMING REINFORCED POLYMER SHEETS

CROSS-REFERENCE TO RELATED APPLICATION

This is a division of application Ser. No. 390,683, filed June 21, 1982, now U.S. Pat. No. 4,457,797, which is a continuation-in-part of our Application Ser. No 355,711 filed Mar. 8, 1982 now abandoned.

BACKGROUND OF THE INVENTION

This invention relates to a process for thermoforming reinforced polymer sheets and forming composite structures wherein at least one exterior surface exactly replicates the mold surface.

Thermoformed articles made of thermoplastic polymer sheets find application, among others, in the automotive industry as well as in other industries. Because plastic offers considerable weight savings over metal, it has been increasingly used for making various auto parts that previously were stamped out of steel sheets. However, plastic body panels have not found wide acceptance, mainly because of their unsatisfactory appearance, which is due in part to defects caused by air trapped between the starting plastic sheet and the adjacent mold surface. When the sheet is very soft, it tends to collapse onto the mold surface before all the air can be removed, and the resulting air pockets cause imperfections on the sheet surface. This is especially so for shallow draw thermoforming. When the sheet is too hard, it cannot exactly replicate the mold surface and appears fairly rough. These defects are exaggerated when the thermoformed part is painted. See, for example, the article entitled "Detroit moves closer to plastic body panels" in the March, 1979, issue of Business Week, pp. 84F and 84G, the note entitled "Cosmetic repair of SMC produces Class A finish" on page 74 of the April, 1979, issue of Plastics World, and the discussion of surface quality on p. 74 of the November, 1980, issue of Plastics World. In all these texts it is suggested that surface imperfections can be corrected by subsequent coating.

A further problem is encountered when the thermoformed sheet is adhered to a backing sheet, which may serve as a reinforcing member and may be ribbed or corrugated for greater strength and rigidity. Frequently the points or areas of bonding of the backing sheet can be seen when looking at the outer face of the front sheet. This phenomenon, known as the "print through" or "read through", can be caused by the practice of effecting the bonding at a temperature at which both members are at or above their glass transition temperatures and are not crystallized. Print through can be avoided by use of a suitable adhesive, which can provide at moderate temperatures composites having good structural integrity.

It thus is desirable to be able to thermoform reinforced poly(ethylene terephthalate) (PET) sheets into articles which have at least one smooth surface, exactly replicating the mold surface, without imperfections, and to form composites which, in addition to having at least one such surface, do not suffer from the print through effect.

SUMMARY OF THE INVENTION

According to the present invention, there is now provided in a process for thermoforming a poly(ethylene terephthalate) sheet having a crystallinity of about 0-5% and a thickness of about 0.76-3.2 mm, preheated to a temperature of about 80°-130° C., at a draw ratio of less than about 1.8, defined as the ratio of the initial sheet thickness to the minimum wall thickness of the thermoformed article, and at a pressure differential of about 200-2000 kPa, in a mold having at least one surface adjacent said sheet of average roughness $R_A$, of about 0.1-0.8 μm, the improvement, which produces a thermoformed article in which its essentially entire surface in contact with said mold surface has an $R_A$ of about 0.1 to 0.8 μm and the concave optical imperfection index of said surface is less than about 6% of the surface area, as determined by image analysis using a microscope having a magnification of 70 times, comprising the following steps:

(A) removing air from the space between said mold surface and said thermoplastic sheet through at least one vent in said mold surface to permit complete contact of said mold surface with said sheet, (B) while applying air pressure to the backside of said sheet, bringing said sheet, before its poly(ethylene terephthalate) crystallinity exceeds about 15%, in complete contact with said mold surface maintained at a temperature of about 130°-180° C., to permit the sheet polymer to completely replicate said mold surface, (C) maintaining said sheet in contact with the mold at a temperature of 130°-180° C. at least until the sheet polymer reaches a degree of crystallinity sufficient to permit demolding without distortion, and (D) demolding the thermoformed article;

with the proviso that the poly(ethylene terephthalate) sheet is reinforced with a mineral filler and, when no reinforced, has a tensile modulus at 100° C., determined as an average of machine direction and transverse direction, within the range of about 7 to 70 MPa, as determined according to ASTM D-638.

Additionally, there also is provided in a process for thermoforming in a mold a first sheet of poly(ethylene terephthalate) having a crystallinity of about 0-5% and a thickness of about 0.76-3.2 mm, preheated to a temperature of about 80°-130° C. at a draw ratio of less than about 1.8, defined as the ratio of the initial sheet thickness to the minimum wall thickness of the thermoformed article, the surface of the mold adjacent said sheet having an average roughness, $R_A$, of about 0.1 to 0.8 μm, and a second, reinforcing, poly(ethylene terephthalate) backing sheet and bonding the second sheet to the first while both sheets are in the mold, the improvement, which results in the first sheet having its essentially entire unbonded surface of an $R_A$ of about 0.1 to 0.8 μm, the concave optical imperfection index of said surface being less than about 6% of the surface area, as determined by image analysis using a microscope having a magnification of 70 times, said improvement comprising the following steps:

(A) removing simultaneously or sequentially air from the spaces between both sheets and their adjacent mold surfaces, maintained at a temperature of about 130°-180° C., through at least one vent in each mold surface, (B) while applying air pressure between both sheets, forming both sheets into their desired shapes while the first sheet has a poly(ethylene terephthalate) crystallinity of at most about 15%, to permit the first sheet polymer to completely replicate the mold surface, (C) maintaining both sheets in contact with the hot mold surfaces at least until the polymer in each sheet polymer reaches a degree of crystallinity sufficient to permit bonding without distortion, (D) bonding the second sheet to the first with an adhesive, while the first sheet is in contact with the mold, (E) maintaining the first sheet in contact with the mold until the bonded structure can be demolded without distortion, and (F) demolding the bonded article;

with the proviso that the first sheet is reinforced with a mineral filler and, when so reinforced, has a tensile modulus at 100° C., determined as an average of machine direction and transverse direction, within the range of about 7 to 70 MPa, as determined according to ASTM D-638.

DETAILED DESCRIPTION OF THE INVENTION

Figure 7:
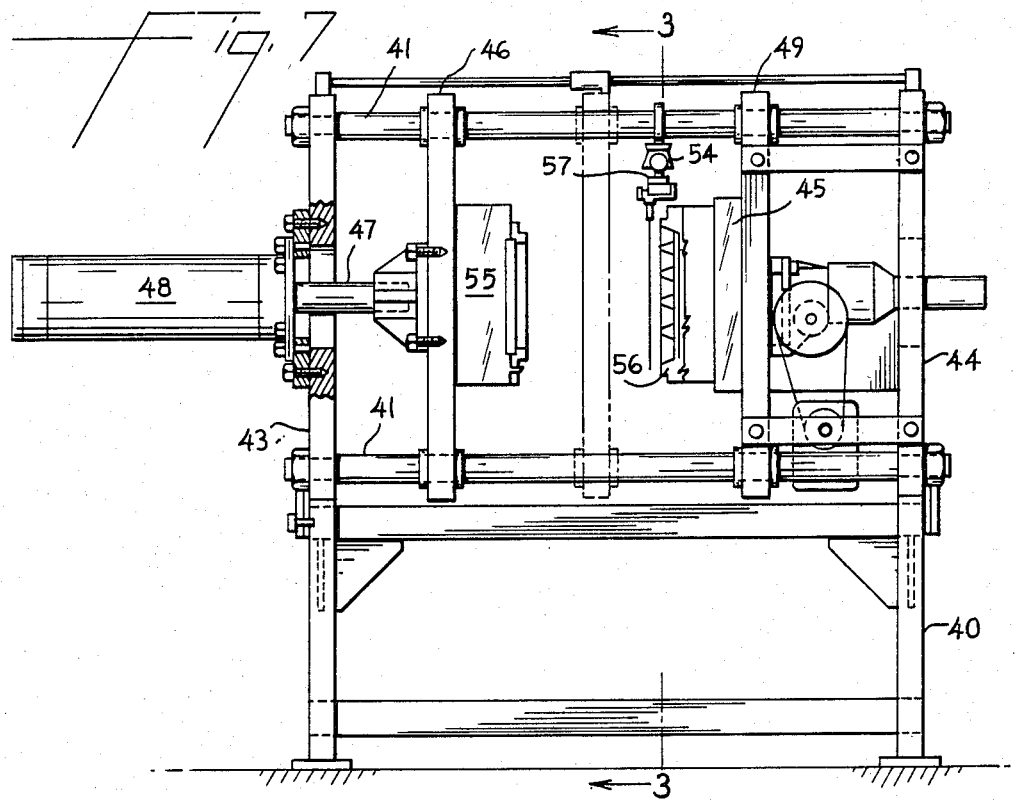

A PET sheet having a crystallinity of about 0-5% is considered amorphous for all practical purposes. Crystallinity is determined from the sheet's density, as explained later in this disclosure. An amorphous PET sheet, when heated to a temperature of about 80°-130° C., will remain substantially amorphous for a period of several seconds to several minutes, but then it will begin to substantially crystallize. Preheating should be uniform to avoid localized hot spots and preferably should be done quickly.

Thermoforming articles from polymer sheets is well known. A polymer sheet is heated above its softening temperature, placed in a hot mold, and brought in contact with mold walls by the use of vacuum, pressure, or a combination of both. Typical thermoforming processes and equipment are described, for example, in U.S. Pat. Nos. 3,935,358 and 3,982,877, both to N. C. Wyeth et al. In the case of reinforced PET, according to the present invention, it is important that all air be removed from between the mold face which is to be exactly replicated and the PET sheet. This may be accomplished either by the use of vacuum prior to or simultaneously with the application of air pressure to the back side of the sheet or simply by the use of air pressure alone. Usually, both vacuum and air pressure will be employed for a thermoformed surface of satisfactory quality. The optimum pressure differential depends among others on the tensile modulus of the filled PET sheet, so that the required pressure differential increases with the modulus but not necessarily in a straight relationship. As a rule of thumb, a pressure differential $$\Delta P \text{ (kPa)} = \frac{\text{Tensile modulus (MPa)}}{7} \times 200$$

will always give satisfactory results, but thermoformed articles of the desired quality may also sometimes be obtained at a lower pressure differential. Whenever measurements are made or results are obtained in units other than SI (metric), they should be converted to SI units. Thus, kPa stands for kilopascals and MPa for megapascals.

The mineral filler can be any material which is effective as a reinforcing agent. Most such materials will be in the form of fibers, for example, glass fibers, graphite fibers, and quartz fibers; others are in the form of platelets, for example, various types of mica; still others may be granular, for example, glass spheres, carbon black, calcium sulfate, and titanium dioxide. A filler is an effective reinforcing agent when the filled composition has a higher tensile strength and tensile modulus than the unfilled base polymer. The level of reinforcing filler will vary but normally will be about 5-50% by weight of the total composition, preferably 10-35%. The preferred filler is glass fibers, especially those having an average length-to-diameter ratio of at least 10. In general, fillers which have an aspect ratio of 10-35 are very effective reinforcing materials. The aspect ratio is the ratio of the largest to the smallest dimension.

The reinforcing material imparts to the filled composition sufficient stiffness at the thermoforming temperature to permit a virtually complete elimination of air from the space between the mold surface and the sheet before full contact of the sheet with the mold is made, especially in shallow draw molds, where the ratio of the initial sheet thickness to the minimum wall thickness of the formed article is 1.3 or less. Full contact in this context does not mean merely conforming the shape of the sheet to the shape of the mold but having at least 94% of all points on the sheet surface in contact with the mold surface so that every detail of the mold surface is reproduced on the sheet, and the concave optical imperfection index is below 6% of the area. The concave optical imperfection index is an experimental value which indicates what proportion of the total surface area is occupied by micropores due to air entrapment. It is best measured by Quantitative Image Analysis using QMS equipment of Bausch & Lomb, which provides a fast and accurate scan interpretation. In practice, twenty randomly selected rectangular surface areas, $1.4 \times 1.9$ mm, are scanned, and the average value is calculated. Because the sheet material must completely wet the mold surface, it is important to bring the sheet and the mold in contact while the sheet polymer is still substantially amorphous and soft; that is, before substantial crystallization occurs. This requirement limits the maximum draw ratio because at draw ratios higher than about 1.8 stress-induced crystallinity prevents adequate polymer flow for complete surface contact. Contact of the sheet with the mold is then maintained until crystallization has reached a sufficiently high level to permit demolding without deformation.

Although the inventors do not wish to be bound by any specific scientific theory, it appears that the success of this invention depends to a large extent on the ability of the polymer in the PET sheet matrix to flow through the filler material from the backside to the front side, so that a thermoformed sheet may be expected to contain a larger amount of polymer material on its front side. Certain analytical techniques lend support to this theory; they are: attenuated total reflectance (ATR), which relies on the relative proportions of reflected and absorbed radiation; X-ray diffraction, which is based on the fact that the intensity of the diffraction pattern depends on the concentration of the crystalline phase in the total multiphase composition; and electron spectroscopy chemical analysis (ESCA), which permits to accurately determine the silicon content on each side of a glass fiber-filled PET sheet. The silicon concentration, naturally, is proportional to the glass content.

It has been often found advisable to further modify the composition by adding to the PET another polymeric material, namely, either a dipolymer of ethylene with an ethylenically unsaturated carboxylic acid or a terpolymer of ethylene with an unsaturated carboxylic acid and with an ester of an ethylenically unsaturated carboxylic acid or with a vinyl ester. The proportion of the carboxylic acid in the dipolymer is about 2–20 weight percent and the respective proportions of the carboxylic acid and of the ester in the terpolymer are about 1–30 weight percent of each, and the amount of the dipolymer or terpolymer is about 1–20% based on the weight of the final, reinforced polymer composition. The carboxylic groups of the dipolymer or terpolymer can either be free or can be converted to their salt form, the cation being a divalent metal ion. Suitable metal ions are, among others, calcium, zinc, and magnesium. Such partially or completely neutralized carboxylated polymers are well known to the art under the generic name "ionomers". Preparation of such materials is described, among others, in U.S. Pat. No. 3,264,272 to Rees and U.S. Pat. No. 3,639,527 to Brinkmann et al., and some ionomers are commercially available. Typical unsaturated carboxylic acids include: acrylic, methacrylic, maleic, and fumaric acids, 3-butenoic and 4-pentenoic acids, and itaconic and aconitic acids. Typical esters include, for example, methyl acrylate, ethyl methacrylate, isobutyl acrylate, diethyl fumarate, dimethyl maleate, and vinyl acetate. The preferred amount of the carboxylic acid copolymer or terpolymer is about 3–10 weight % of the reinforced polymer composition.

Representative tensile modulus values at 100° C. for glass fiber-reinforced PET sheets are given below. In all cases, the crystallinity of the test samples was below about 5% at the time the measurements were made. At higher crystallinities the moduli would be higher.

| Composition, Wt. % Glass/Ionomer/PET | | | 100° C. Average Tensile Modulus, MPa |
|---|---|---|---|
| 0 | 0 | 100 | 1.72 |
| 29 | 6 | 65 | 21.7 |
| 32 | 6 | 62 | 30.1 |
| 36 | 6 | 58 | 34.1 |
| 20 | 0 | 80 | 25.1 |
| 32 | 0 | 68 | 38.3 |

The values of tensile modulus depend to some extent on the method employed to prepare the filled PET compositions. For example, compositions made in a twin-screw extruder (like those above) can be expected to have lower tensile moduli than those made in a single-screw extruder since more breakage of the filler material (especially glass fiber) occurs in the former than in the latter.

Thermoforming a reinforced PET sheet can be readily accomplished in conventional equipment, for example, such as shown in FIGS. 1–5. FIG. 1 is a side view of a horizontal thermoforming mold, which may be mounted in a benchtop hydraulic press having a stationary platen 4 and a movable platen 3. Platen 4 carries mold member 8, and platen 3 carries mold member 7. Channel 10 drilled through member 8 and communicating with centrally located channel 10a is connected with a source of compressed air (not shown). A similar channel 11 drilled through member 7 and communicating with a centrally located channel 11a is connected with a source of vacuum (not shown). Mold member 7 carries spherical mold plate 13 which is held in place by clamp ring 9. Clamp ring 9 has around its circumference ridge 29, which is aligned with circular slot 16 in mold member 8 to provide a perimeter seal during the operation. Mold plate 13 has on its backside slot ring 25, which is intersected by small holes 23 regularly distributed around the perimeter of mold plate 13. Holes 23, which are connected to vacuum channel 11 by means of slot ring 25 and passage 27, serve to apply vacuum to the face of mold plate 13.

Each mold member is heated by electric heating rods, which have separate controls and can be maintained at different temperatures within the range of about 130°–180° C.

FIG. 2 is the front view of the same thermoforming mold. This figure shows, among others, heating rods 18 and 31, compressed air channels 10 and 10a, vacuum channels 11 and 11a, and thermocouples 20 and 33.

In operation, reinforced poly(ethylene terephthalate) sheet 35 is preheated in a flat press to a temperature of about 80°–130° C., then transferred to the thermoforming mold, as shown in FIG. 3. Preheating can be effected, if desired, in other types of heating equipment or even in the thermoforming mold itself. Mold member 7 is then raised hydraulically into contact with mold member 8. As shown in FIG. 4, this closes clamping ring 9 against mold member 8 to effect a perimeter seal. Mold member 7 is then evacuated via channel 11. This causes sheet 35 to conform generally, but not completely, to the contour of mold member 7 and particularly mold plate 13. Pressure is now applied through channels 10 and 10a. Sheet 35 is thus forced against the face of mold member 7, and particularly of mold plate 13, and acquires its final shape, conforming to mold plate 13, as shown in FIG. 5. The pressure is then relieved, and the sheet is left in the mold until the desired degree of crystallinity has been reached. The vacuum is relieved, and the mold is opened to remove the thermoformed article.

The starting reinforced PET sheet normally has a rough surface and, depending on the amount of mineral reinforcing agent, can be quite stiff. In order to thermoform an article having a very smooth surface, it is necessary to maintain the right temperature and pressure conditions not only to permit the sheet to conform to the shape of the mold but also to permit the molten polymer material to flow through the reinforcing agent so as to make an essentially complete contact with the mold.

Several experiments were run to study the various parameters affecting the operability of the single sheet thermoforming process according to the present invention. Glass fiber-reinforced poly(ethylene terephthalate) sheeting, optionally also containing Du Pont "Surlyn" 1855 ionomer, was used for this purpose. For comparison, unreinforced PET also was tested. In all cases, PET sheeting was extruded in a conventional twin-screw extruder maintained at a barrel temperature of 265°–270° C. through a die heated to 275° C. and taken up on a standard three-roll finisher maintained at top, middle, and bottom roll temperatures of 25°, 52°, and 25° C. respectively. The sheeting had an average thickness of 60 mils (1.524 mm) and had a crystallinity of less than 5%, as determined by its density measurements. Poly(ethylene terephthalate) was Goodyear "Cleartuf" 7202A resin having inherent viscosity of 0.72 dL/g, as determined at 25° C. at a concentration of 0.32 g/100 mL in a mixture of 25 vol. % of trifluoroacetic acid and 75 vol. % of methylene chloride, and glass fibers were Owens-Corning-Fiberglass 416×15 chopped strands, 3/16 inch (4.8 mm) long.

Sheets, 6×6 inches (15.24×15.24 cm) were cut from the sheeting and used in the tests. The surface roughness of both sides of the sheets was determined with a profilometer, both in the machine direction (MD) and transverse direction (TD). The profilometer used in these experiments travels a distance of 2.5 cm across the surface of the sheet and generates an average roughness number, Ra, in either microinches or micrometers. The surface of a sheet must be flat during the measurement.

The thermoforming mold corresponds to that represented in FIGS. 1-5, wherein mold plate 13 has a diameter of 4.1 inches (10.25 cm), and clamp ring 9 has the effective height (excluding ridge 29) of 0.28 cm. The surface of mold plate 13 has an average roughness, Ra, of 0.016 inch (0.4 μm). The mold plate material is aluminum 6061. The mold temperature was 140° C. The following parameters were studied: sheet composition, preheat temperature and time, and thermoforming vacuum and pressure. The results of these tests are provided in the following Table 1. In all cases where both vacuum and pressure were applied, vacuum was applied first, and pressure was applied 3 seconds later, except in Example 15, where vacuum was applied 9 seconds later. In all cases, the draw ratio, determined according to the definition in this disclosure, was 1.05.

TABLE 1

| Sample No. | Composition glass/ionomer/PET | | | Preheat T, °C. | t, sec. |
|---|---|---|---|---|---|
| 1 | 0 | 0 | 100 | 25 | — |
| 2 | 0 | 0 | 100 | 60 | 10 |
| 3 | 0 | 0 | 100 | 80 | 20 |
| 4 | 0 | 0 | 100 | 100 | 20 |
| 5 | 0 | 0 | 100 | 110 | 20 |
| 6 | 0 | 0 | 100 | 130 | 10 |
| 7 | 0 | 0 | 100 | 140 | 10 |
| 8 | 0 | 0 | 100 | 110 | 20 |
| 9 | 0 | 0 | 100 | 110 | 20 |
| 10 | 0 | 0 | 100 | 110 | 20 |
| 11 | 0 | 0 | 100 | 110 | 20 |
| 12 | 29 | 6 | 65 | 25 | — |
| 13 | 29 | 6 | 65 | 110 | 15 |
| 14 | 29 | 6 | 65 | 140 | 15 |
| 15 | 29 | 6 | 65 | 110 | 15 |
| 16 | 29 | 6 | 65 | 110 | 15 |
| 17 | 29 | 6 | 65 | 110 | 15 |
| 18 | 29 | 6 | 65 | 110 | 15 |
| 19 | 29 | 6 | 65 | 110 | 15 |
| 20 | 29 | 6 | 65 | 110 | 15 |
| 21 | 29 | 6 | 65 | 110 | 15 |
| 22 | 32 | 6 | 62 | 110 | 15 |
| 23 | 32 | 6 | 62 | 110 | 15 |
| 24 | 32 | 6 | 62 | 110 | 15 |
| 25 | 36 | 6 | 58 | 110 | 15 |
| 26 | 20 | 0 | 80 | 25 | — |
| 27 | 20 | 0 | 80 | 110 | 15 |
| 28 | 32 | 0 | 68 | 25 | — |
| 29 | 32 | 0 | 68 | 110 | 15 |

| Sample No. | Vacuum Inch. Hg | kPa | Pressure psi | kPa | COII* % Area |
|---|---|---|---|---|---|
| 1 | 30 | 101 | 100 | 690 | ** |
| 2 | 30 | 101 | 100 | 690 | ** |
| 3 | 30 | 101 | 100 | 690 | ** |
| 4 | 30 | 101 | 100 | 690 | ** |
| 5 | 30 | 101 | 100 | 690 | ** |
| 6 | 30 | 101 | 100 | 690 | ** |
| 7 | 30 | 101 | 100 | 690 | ** |
| 8 | 30 | 101 | 60 | 414 | ** |
| 9 | 20 | 67 | 100 | 690 | ** |
| 10 | — | — | 100 | 690 | ** |
| 11 | 30 | 101 | — | — | ** |
| 12 | 30 | 101 | 100 | 690 | 1.93 |
| 13 | 30 | 101 | 100 | 690 | 2.29 |
| 14 | 30 | 101 | 100 | 690 | 32.3 |
| 15 | 30 | 101 | 100 | 690 | 4.76 |
| 16 | 10 | 33 | 100 | 690 | 2.87 |
| 17 | 15 | 50 | 100 | 690 | 3.52 |
| 18 | 30 | 101 | 80 | 552 | 2.40 |
| 19 | 30 | 101 | 40 | 276 | 8.27 |
| 20 | — | — | 100 | 690 | 5.81 |
| 21 | 30 | 101 | — | — | 57.8 |

TABLE 1-continued

| 22 | 30 | 101 | 100 | 690 | 1.76 |
|---|---|---|---|---|---|
| 23 | 15 | 50 | 100 | 690 | 4.14 |
| 24 | 30 | 101 | 80 | 552 | 7.24 |
| 25 | 30 | 101 | 100 | 690 | 9.17 |
| 26 | 30 | 101 | 100 | 690 | 1.53 |
| 27 | 30 | 101 | 100 | 690 | 2.88 |
| 28 | 30 | 101 | 100 | 690 | 1.89 |
| 29 | 30 | 101 | 100 | 690 | 1.17 |

*COII: Concave Optical Imperfection Index
**Large areas of surface retained initial sheet roughness because entrapped air prevented complete contact of the sheet with the mold. As a result, these samples had gross imperfections 1 mm to several centimeters in size, which were immediately apparent to the eye.

As can be seen from the above table, all unreinforced PET sheets gave unsatisfactory results. Reinforced PET sheets were thermoformed to a finished product having low surface roughness and low concave optical imperfection index (COII). Surface roughness data are given below in Table 2.

TABLE 2

| | Initial Surface, Ra μm | | | |
|---|---|---|---|---|
| | Cosmetic Side* | | Back Side | |
| Sample No. | MD | TD | MD | TD |
| 1 | 0.33 | 0.43 | 0.30 | 0.43 |
| 2 | 0.33 | 0.28 | 0.36 | 0.30 |
| 3 | 0.38 | 0.41 | 0.41 | 0.36 |
| 4 | 0.51 | 0.46 | 0.43 | 0.30 |
| 5 | 0.51 | 0.64 | 0.51 | 0.25 |
| 6 | 0.48 | 0.41 | 0.33 | 0.38 |
| 7 | 0.61 | 0.51 | 0.30 | 0.30 |
| 8 | 0.51 | 0.46 | 0.25 | 0.30 |
| 9 | 0.56 | 0.43 | 0.33 | 0.25 |
| 10 | 0.56 | 0.46 | 0.36 | 0.36 |
| 11 | 0.46 | 0.30 | 0.30 | 0.36 |
| 12 | 4.32 | 5.33 | 4.57 | 4.57 |
| 13 | 3.81 | 4.32 | 4.57 | 4.57 |
| 14 | 4.32 | 4.06 | 5.08 | 4.83 |
| 15 | 4.32 | 4.32 | 5.08 | 5.33 |
| 16 | 5.08 | 5.33 | 5.33 | 5.59 |
| 17 | 4.06 | 4.32 | 5.08 | 5.33 |
| 18 | 5.08 | 5.33 | 5.33 | 5.33 |
| 19 | 3.81 | 4.06 | 4.83 | 5.33 |
| 20 | 5.08 | 5.59 | 5.08 | 4.83 |
| 21 | 4.32 | 3.81 | 5.08 | 4.57 |
| 22 | 5.84 | 6.10 | 6.10 | 6.10 |
| 23 | 6.10 | 6.10 | 4.57 | 4.83 |
| 24 | 6.35 | 6.86 | 5.59 | 6.35 |
| 25 | 5.59 | 6.10 | 5.33 | 5.08 |
| 26 | 4.06 | 4.06 | 1.78 | 2.03 |
| 27 | 5.08 | 5.33 | 1.78 | 2.29 |
| 28 | 7.11 | 8.13 | 6.35 | 5.84 |
| 29 | 6.60 | 6.60 | 5.84 | 5.59 |

| | Final Surface, Ra μm | | | |
|---|---|---|---|---|
| | Cosmetic Side* | | Back Side | |
| Sample No. | MD | TD | MD | TD |
| 1 | 0.20 | 0.23 | 0.18 | 0.20 |
| 2 | 0.30 | 0.33 | 0.25 | 0.43 |
| 3 | 0.23 | 0.20 | 0.20 | 0.15 |
| 4 | 0.30 | 0.30 | 0.20 | 0.20 |
| 5 | 0.33 | 0.36 | 0.38 | 0.25 |
| 6 | 0.25 | 0.36 | 0.46 | 0.46 |
| 7 | 0.36 | 0.28 | 0.64 | 0.64 |
| 8 | 0.23 | 0.23 | 0.46 | 0.43 |
| 9 | 0.28 | 0.41 | 0.46 | 0.51 |
| 10 | 0.28 | 0.30 | 0.71 | 0.76 |
| 11 | 0.33 | 0.46 | 0.64 | 0.56 |
| 12 | 0.38 | 0.33 | 4.57 | 5.33 |
| 13 | 0.33 | 0.36 | 4.83 | 4.06 |
| 14 | 0.33 | 0.38 | 1.27 | 1.14 |
| 15 | 0.43 | 0.56 | 4.57 | 4.06 |
| 16 | 0.41 | 0.41 | 3.81 | 4.06 |
| 17 | 0.38 | 0.36 | 4.57 | 4.83 |
| 18 | 0.36 | 0.33 | 3.56 | 3.56 |
| 19 | 0.46 | 0.58 | 3.81 | 3.56 |
| 20 | 0.41 | 0.76 | 3.56 | 3.30 |
| 21 | 2.54 | 2.29 | 4.06 | 3.81 |

TABLE 2-continued

| | | | | |
|---|---|---|---|---|
| 22 | 0.36 | 0.33 | 2.79 | 3.30 |
| 23 | 0.46 | 0.38 | 4.06 | 4.83 |
| 24 | 0.56 | 0.61 | 3.81 | 5.08 |
| 25 | 0.64 | 0.66 | 5.08 | 4.57 |
| 26 | 0.33 | 0.33 | 4.83 | 5.08 |
| 27 | 0.36 | 0.38 | 2.79 | 3.56 |
| 28 | 0.41 | 0.41 | 5.59 | 5.33 |
| 29 | 0.46 | 0.51 | 5.08 | 5.08 |

*"Cosmetic side" is the side in contact with mold face 13 (FIGS. 1–5), for which a low COII and a low Ra is desired.

At the mold temperature, the crystallinity of the PET sheet increases with time until it reaches a plateau.

The degree of crystallinity of crystallized, reinforced plastic sheet is determined from density measurements as follows:

First, sheet density is calculated from the following equation:

$$D_2 = X_2/(1/D_s - X_1/D_1)$$

where
$D_2$ = polymer density
$X_2$ = polymer weight fraction
$D_s$ = Sample composite sheet density
$D_1$ = Reinforcing agent density
$X_1$ = Reinforcing agent weight fraction.

The density of the composite sheet is determined by measuring the apparent loss of weight while the sheet is immersed in deaerated, distilled water and using the following equation:

$$D_s = D_H(WA/(WA - WH))$$

where
$D_H$ = Density of water taken as 1.0
WA = Sample weight in air
WH = Sample weight in water.

The percent crystallinity is determined using the following equation:

$$\text{Percent Crystallinity} = [(D_2 - DA)/(DC - DA)] \times 100$$

where
DA = Density of amorphous polymer
DC = Density of 100% crystalline polymer
For PET DA = 1.333 g/cm$^3$ and
DC = 1.455 g/cm$^3$.

Figure 6:
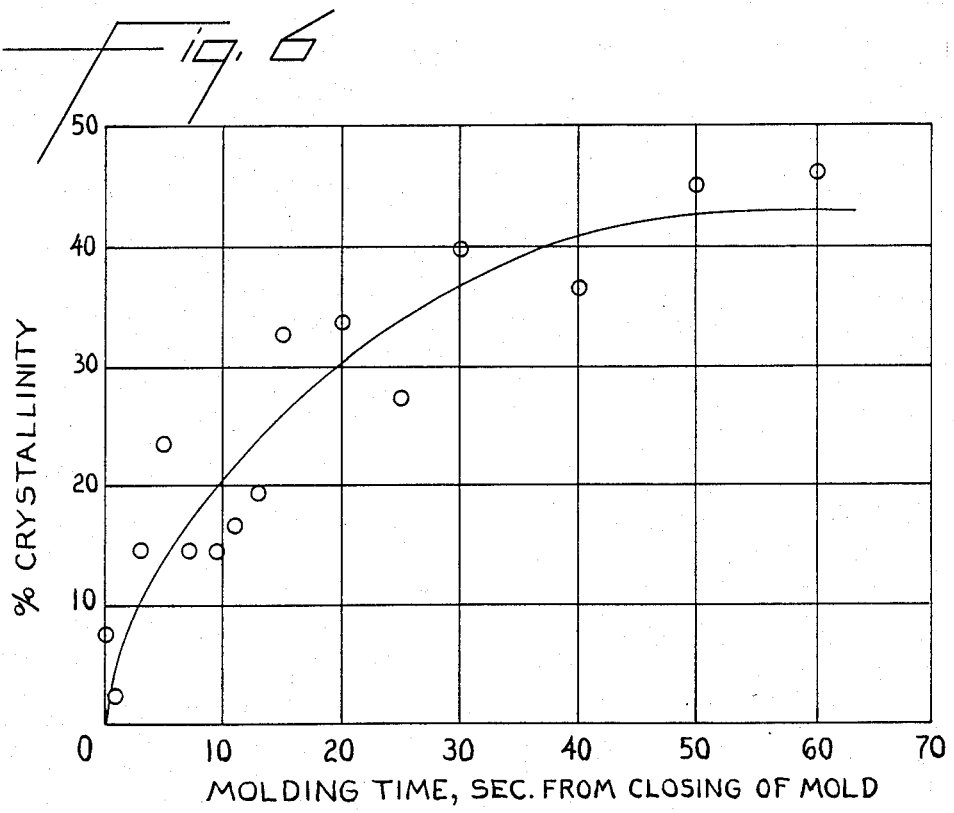

FIG. 6 is a graph representing the relationship between the PET sheet crystallinity and the time in seconds, from the closing of the mold (clamping ring 9 closes against mold member 8, as shown in FIG. 4). In can be seen that the crystallinity of the PET sheet at the mold temperature of 140° C. remains at not over about 15% during the first 6 seconds. According to the operating procedure in these experiments, the sheet was fully in contact with the mold surface within 3–5 seconds, so that the crystallinity condition at the time of contact was satisfied. This curve is considered to be only typical and not general since its actual shape will depend in each case on the preheat history of the sample. However, it is quite representative of this important relationship.

It often is desired to bond to the backside of a thermoformed plastic sheet a reinforcing plastic member (frequently ribbed or corrugated for greater strength), which may be formed in the same operation as the first sheet. It has been found most practical to use adhesive bonding to avoid print through. The face member and the backing member must first be allowed to harden by crystallization sufficiently to permit adhesive bonding to each other without deformation or print through.

FIG. 7 is the side view of a thermoforming apparatus useful in forming composite articles according to the process of this invention. It comprises frame 40 having end plates 43 and 44, four guide rods 41 secured to end plates 43 and 44, a stationary platen 49, and a movable platen 46 supported and guided by rods 41. Platen 46 is connected to rod 47 of hydraulic cylinder 48 mounted on end plate 43 and can thus be hydraulically moved from left to right. Platen 46 carries mold member 55. Platen 49 carries mounting plate 45 on which is mounted mold member 56. Each mold member is heated by hot oil circulating through internal passages not shown. The rate of flow of hot oil can be controlled by separate valves (not shown), so that each mold member can be maintained at a different temperature, if desired. At the beginning of the operating cycle, movable platen 46 is brought into a position (shown in broken lines) where the faces of mold members 55 and 56 are about 10 cm apart.

FIG. 8 is the end view of the apparatus shown in FIG. 7. Referring now to FIG. 8, 53 is a sheet transporter, which comprises a rodless air cylinder 54 hung from guide rods 41 and a hanging means, 57, for supporting plastic sheets. It extends from sheet heating position 65 to loading/unloading position 66.

The hanging means 57 has a fluid passage (not shown), which is supplied with compressed air through hose 61, as shown in FIG. 8. Plastic sheets 60 are hung in pairs in hanging means 57 and moved to the heat zone. Sheet heating means 65 consists of two electrical radiant heaters, which can be maintained at the same or different temperatures. Plastic sheets 60 are moved into this space and held there for the desired time, e.g., 5–60 seconds. The sheet which is to become the face member of the final thermoformed article is thus preheated to about 80° C. and the sheet which is to become the backing member is preheated to a convenient temperature, for example, 80°–100° C. As in the case of single sheet thermoforming, above, other preheating means, including the thermoforming mold itself, can be used. The sheet transporter then carries the sheets into the space between mold members 55 and 56.

FIG. 9 shows the initial arrangement of mold members 55 and 56 seen from the same side as in FIG. 7. Mold member 55 is intended to form the smooth (cosmetic) face member of the composite article, while mold member 56 forms the backing, reinforcing member. Extending around three sides of mold member 55 is pinch bar 82, which has a V-shaped ridge 82a aligned with slot 38 on mold member 56. Extending across the tops of mold members 55 and 56 are knife edges 84. The function of the pinch bar and knife edges is to form a perimeter seal. However, the seal at the top formed by knife edges 84 still allows air to be introduced between the two plastic sheets 60. Mold plate 62 has on its backside slots 71, which are intersected by small diameter holes 72 regularly distributed around the perimeter of plate 62. Holes 72 emerge on the outer face in close proximity to the inner surface of clamp frame 39 and serve to apply vacuum to the face of plate 62.

Inside the cavity in mold member 55 is slot 73 which communicates with slots 71 in mold plate 62 and also connects to drilled holes 88, one of which extends to an outer surface of mold 55, where it is connected to vacuum (not shown). Mold face 86 of mold member 55 is finished to an average surface roughness, $R_A$, of about 0.1 to 0.8 μm.

Mole member 56 has a rectangular cavity occupied by plate 93, which is slightly smaller than the cavity and leaves slot 52 on all sides. Behind slot 52 is a larger slot 59 which runs around the entire perimeter of the mold cavity and communicates with holes 51, one of which communicates with a source of vacuum (not shown). Plate 93 may be moved a small distance to the left by means of pistons 50 (one shown). Compressed air can be admitted to pistons 50 via drilled channel 75. Pyramidical members 74 attached to plate 93 serve to produce corrugations on the plastic sheet being thermoformed.

In operation, a sheet 100 of reinforced PET and a backing sheet 101 are assembled as shown in FIGS. 10 and 11 and hung from hanging means 57 of the thermoforming apparatus shown in FIGS. 7 through 9. In FIGS. 10 and 11 the face sheet 100 is smooth and the backing sheet 101 is ribbed to provide air passages. Prior to the assembly, the inside surfaces of either one or both sheets are coated with a suitable adhesive.

Figure 14:
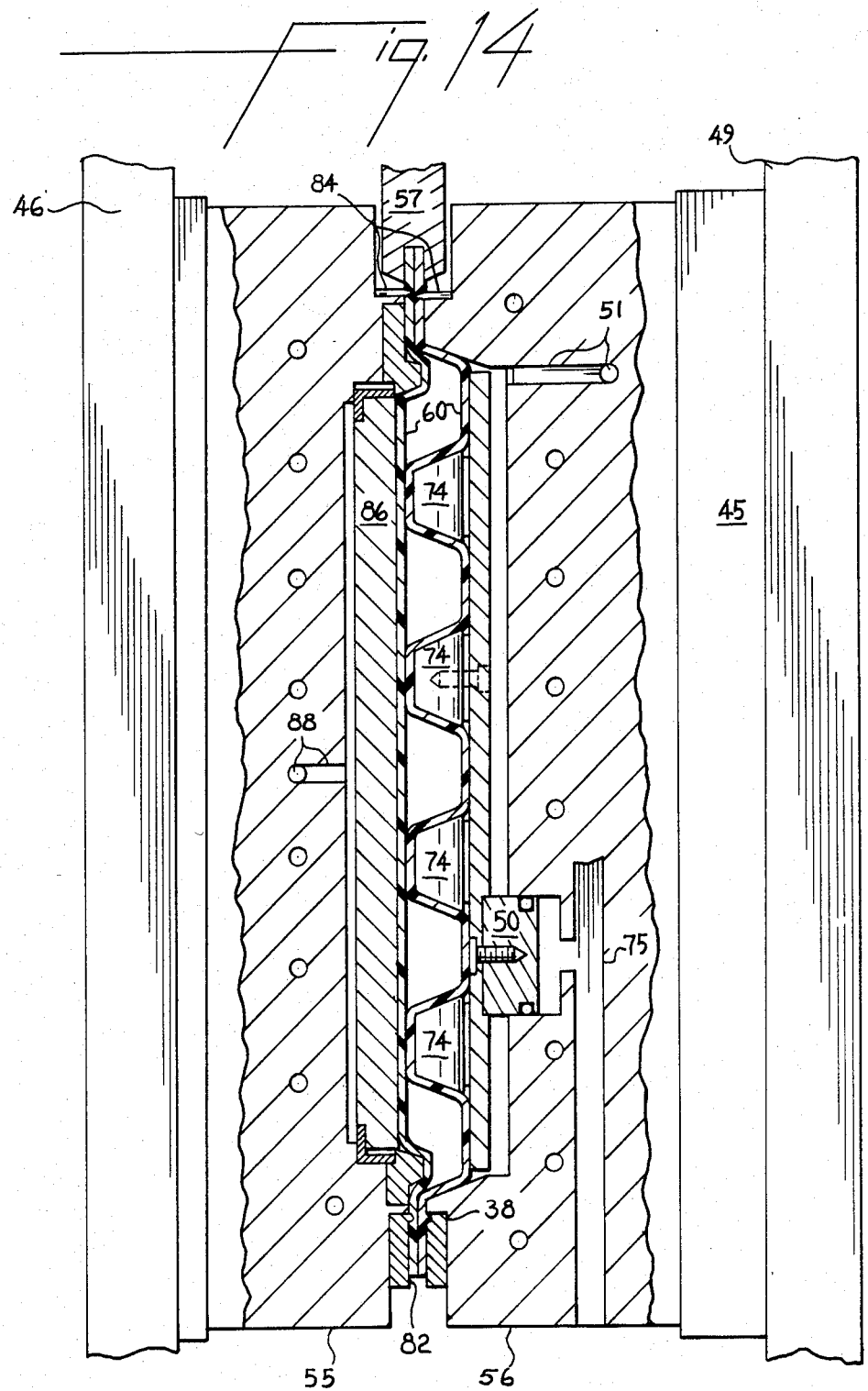

With reference to FIG. 8, sheets 60 initially are in position 66, from which they are moved by means of sheet transporter 53 through the open mold behind platen 46 to heating means 65. After a preheating cycle of 20 seconds, the assembly is moved into the open mold space, as shown in FIG. 9. Mold member 55 is then moved right into contact with mold member 56. As shown in FIG. 12, pinch bar edge 82a and knife edges 84 effect a perimeter seal. Mold member 55 is evacuated, causing both sheets 60 to conform generally, but not completely, to the contour of this mold member. Compressed air is now introduced between sheets 60 through the manifold in hanging means 57, and vacuum is simultaneously applied to mole member 56. As shown in FIG. 13, both sheets 60 are now forced against the faces of their respective mold members and acquire their final shapes conforming to those of the mold plates. The face sheet still is in a substantially amorphous state, below a crystallinity of about 15%, and, because of its intimate contact with the mold plate, it completely replicates the smooth finish of the mold plate, so that its degree of roughness, $R_A$, is essentially the same as that of the mold. Continued contact of both sheets with the hot mold members promotes crystallization of the polymer. When the desired degree of crystallinity has been reached, air pressure between the sheets is relieved. Air pressure is then applied to pistons 50 in mold member 56. This drives plate 93 to the left, so that the apices of the pyramids 74 bring the corrugations of the backing sheet in contact with the face sheet, producing bonds at contact points as shown in FIG. 14. Alternatively, pistons 50 can drive plate 93 to the left while pressure is maintained between the plastic sheet. The bonded assembly is maintained in the mold for sufficient time to achieve sufficient hot bond strength. Air pressure on piston 50 is then relieved and vacuum is applied to channel 75, causing plate 93 to withdraw to its initial position. Platen 46 is retracted by means of cylinder 48 and rod 47, withdrawing mold member 55.

The thermoformed, molded assembly is now moved to the unloading area 66 shown in FIG. 8 and removed from the hanging means.

In order to avoid distortion of the thermoformed composite structure, it is important to have both the face member and the backing member formed of sheets having matched compositions. While the exact types and amounts of filler materials will not necessarily be the same, they usually will be close; and when the filler material is oriented, e.g. fibrous, the initial orientation of both sheets (machine direction of transverse direction) also will be the same. Since the appearance of the backing member is of considerably less importance than that of the face member, the strict operating parameters that apply to the formation of the face member may not be necessary with respect to the backing member. In particular, depending on the exact composition of the backing member PET sheet, it may be possible to preheat the sheet to a different temperature, use a different pressure differential (e.g., by controlling the amount of vacuum, if any, applied to the back side), and even to use a mold member which will produce a different draw ratio, so long as the mechanical integrity of the backing member is not adversely affected.

Since composite articles made according to this invention are adhesive-bonded, rather than melt-bonded, the choice of a suitable adhesive is important. Suitable adhesives must be able to develop sufficient bond strength at the thermoforming temperature, whch may be as high as 200° C. or even higher, to permit demolding without distortion. The adhesives may be either thermoplastic or thermosetting. They must adhere well to both plastic sheets and should not have a high modulus when cured because high modulus could cause distortion of the face sheet on cooling. Typical bonding compositions that can be used in the process of this invention include, for example, epoxy resins, polyurethanes, and amorphous polyesters.

Suitable epoxy adhesives include "Scotch-weld" brand structural adhesive 2216 B/A of 3M Company. A good polyurethane adhesive is "UR" 2101 two-part urethane of H. B. Fuller Company, and suitable amorphous polyesters include Eastman's "PETG" copolymer.

In actual experiments using the above-described equipment illustrated in FIGS. 7–9, 12, and 13, composite structures were formed from PET sheets having the following composition (wt. %):

| PET | 65 |
| --- | --- |
| ionomer | 5 |
| glass fiber | 30 |

Both sheets had an initial crystallinity of less than about 5% and an average tensile modulus at 100° C. of 36.9 MPa.

The face sheet was flat, while the backing sheet was corrugated (ribbed), as shown in FIG. 11.

Each sheet was coated prior to the thermoforming operation with Eastman's "PETG" adhesive copolymer, which is solid at room temperature but has a glass transition temperature of about 81° C.

The sheets were assembled as shown in FIGS. 10 and 11 so that the adhesive-coated surfaces faced each other. The initial surface roughness of the face sheet on the side adjacent the mold face (thus, the uncoated side), Ra was usually about 250 μin. (6.3 μm) but in no case more than 500 μin. (12.5 μm). Both sheets were preheated to about 80° C., placed in the open mold, and equilibrated for about 6 seconds before the mold was closed. The mold temperature was about 130°–150° C., with best results obtained at the lower end of this range. The average variation of the mold surface temperature was kept within 3.8° C. The surface roughness Ra of mold face 86 of mold member 55 (FIGS. 9, 12, and 13) was 16–32 μin. (0.4–0.8 μm).

After mold members 55 and 56 closed and clamped, a vacuum of no less than 25 in Hg (84 kPa) was applied to each mold member and held for 1–4 seconds. Compressed air then was introduced into the space between the sheets. The air pressure was 85–100 psi (586–690 kPa). Higher pressures produced at most a marginal quality improvement. Depending on the PET sheet composition, pressures of less than the lower limit of this range may produce surfaces with discernible imperfections.

Vacuum and pressure were held for approximately 90 seconds or until the face sheet reached adequate crystallinity. Compressed air was then vented, and the vacuum on the back side of the backing sheet was released.

The backing member was moved a distance of 0.2–0.6 in (0.5–1.5 cm) into contact with the face member. The contact point pressure was 12–75 psi (83–517 kPa). Contact was maintained for about 30 seconds, and the backing mold plate was withdrawn. Vacuum was then released, and the mold was opened for composite part's removal.

The average roughness of the cosmetic face of the face member of the composite was 16–32 μin (0.4–0.8 μm), the same as that of the mold face, and the concave optical imperfection index (COII) was below 6%.

Articles thermoformed by the process of the present invention, whether single sheet or a composite structure having a face member and a backing member, find use in a number of applications, particularly in the automobile industry. The thermoformed articles thus include, for example, a variety of automotive parts, especially body panels, both interior and exterior, dashboards, floorboards, air dams, headliners, window decks, hoods, truck lids, seats, and underbody parts. Non-automotive applications of the process of the present invention include, among others, the thermoforming of aircraft parts such as body panels, seats, and ducts; shipping containers; construction elements such as siding panels, overhead garage door panels, and partitions; marine parts such as boat body panels, seating, and deck surfaces; appliance parts including body panels, ducts, and small appliance housings; institutional food service trays; sanitary ware such as toilet seats, towel dispensers, and shower enclosures; solar collectors; enclosures and housings for a variety of equipment, including electronic equipment, pumps, X-ray machines, and lawn-mowers; furniture such as chairs and tables; and a host of other industrial, residential, recreational and transportation uses.

We claim:

1. An article thermoformed from a poly(ethylene terephthalate) sheet reinforced with glass fibers, which fibers are present in an amount within the range of about 5–50% by weight of the sheet composition, said thermoformed article having been thermoformed at a draw ratio of less than about 1.8, defined as the ratio of the initial thickness of the poly(ethylene terephthalate) sheet to the minimum wall thickness of the article, said article having without any further treatment at least one surface having an average roughness, $R_A$, of about 0.1–0.8 μm, and a concave optical imperfection index of less than about 6% of the surface area as determined by image analysis using a microscope having a magnification of 70 times.

2. The article of claim 1 wherein the fibers have an average length to diameter ratio of at least 10.

3. The article of claim 1 wherein the amount of glass fibers in the reinforced polymer composition is about 10–35 weight percent.

4. An article of claim 1 wherein the reinforced polymer composition also contains another polymer material selected from the group consisting of dipolymers of ethylene with an unsaturated carboxylic acid, terpolymers of ethylene with an unsaturated carboxylic acid and an ester of an unsaturated carboxylic acid, and terpolymers of ethylene with an unsaturated carboxylic acid, and a vinyl ester, the proportion of the carboxylic acid in the dipolymers being about 2–20 weight percent, and the respective proportions of the carboxylic acid and of the ester in the dipolymers being about 1–30 weight percent of each; and the amount of the dipolymer or terpolymer being about 1–20% based on the weight of the reinforced polymer composition, with the proviso that the carboxylic groups may be completely or partially neutralized with divalent metal ions.

5. The article of claim 4, wherein the carboxylic groups are partially or completely neutralized with zinc, magnesium, or calcium ions.

6. The article of claim 3 wherein the proportion of the dipolymer or terpolymer in the reinforced polymer composition is about 3–10%.

7. An article having a face member and a backing member adhesively bonded to the face member, each member being thermoformed from a sheet of a poly(ethylene terephthalate) composition reinforced with a mineral filler, the face member having been thermoformed at a draw ratio of less than about 1.8, defined as the ratio of the initial thickness of the poly(ethylene terephthalate) sheet to the minimum wall thickness of the face member, said face member having without any further treatment at least one surface having an average roughness, $R_A$, of about 0.1–0.8 μm, and a concave optical imperfection index of less than about 6% of the surface area, as determined by image analysis using a microscope having a magnification of 70 times; with the proviso the mineral filler in the face member is glass fibers, and the amount of the glass fibers is about 5–50% by weight of the sheet composition.

8. The article of claim 7 wherein the face member is thermoformed at a draw ratio of at most 1.3.

9. The article of claim 7 wherein the backing member has the same composition as the face member.

10. The article of claim 9 wherein the average length to diameter ratio of the glass fibers is at least 10.

11. The article of claim 9 wherein the amount of glass fibers in the poly(ethylene terephthalate) composition is 10–35% by weight.

12. The article of claim 7 wherein the poly(ethylene terephthalate) sheet material also contains another polymeric material selected from the group consisting of dipolymers of ethylene with an unsaturated carboxylic acid, terpolymers of ethylene with an unaturated carboxylic acid and an ester of an unsaturated carboxylic acid, and terpolymers of ethylene with an unsaturated carboxylic acid and a vinyl ester, the proportion of the carboxylic acid in the dipolymers being about 2–20 weight percent, and the respective proportions of the carboxylic acid and of the ester in the terpolymers being about 1–30 weight percent of each; and the amount of the dipolymer or terpolymer being about 1–20% based on the weight of the reinforced polymer composition.

13. The article of claim 12, wherein the carboxylic groups are partially or completely neutralized with zinc, magnesium, or calcium ions.

14. The article of claim 13 wherein the amount of the dipolymer or terpolymer is 3–10% based on the weight of the reinforced polymer composition.

15. An article of claim 1 selected from the class consisting of automotive parts, aircraft parts, construction elements, marine parts, appliance parts, food service trays, sanitary articles, solar collectors, equipment housings, and furniture.

16. An article of claim 2 made of a composition containing a filler having an aspect ratio of about 10–35.

17. An article of claim 16 wherein the filler is glass fibers.

18. An article of claim 17 which is an automotive part.

19. An article of claim 17 which is an aircraft part.

20. An article of claim 17 which is a marine part.

21. An article of claim 17 which is a construction element.

22. An article of claim 17 which is a food service tray.

23. An article of claim 17 which is a sanitary article.

24. An article of claim 17 which is a solar collector.

25. An article of claim 17 which is an equipment housing.

26. An article of claim 17 which is an article of furniture.

27. An article of claim 7 selected from the class consisting of automotive parts, aircraft parts, construction elements, marine parts, appliance parts, food service trays, sanitary articles, solar collectors, equipment housings, and furniture.

28. An article of claim 27 made of a composition containing a filler having an aspect ratio of about 10–35.

29. An article of claim 28 wherein the filler is glass fibers.

30. An article of claim 29 which is an automotive part.

31. An article of claim 29 which is an aircraft part.

32. An article of claim 29 which is a marine part.

33. An article of claim 29 which is a construction element.

34. An article of claim 29 which is a food service tray.

35. An article of claim 29 which is a sanitary article.

36. An article of claim 29 which is a solar collector.

37. An article of claim 29 which is an equipment housing.

38. An article of claim 29 which is an article of furniture.

* * * * *